April 13, 1948. W. C. JOHNSON 2,439,740
ARC WELDING APPARATUS
Filed Dec. 29, 1943 2 Sheets-Sheet 1
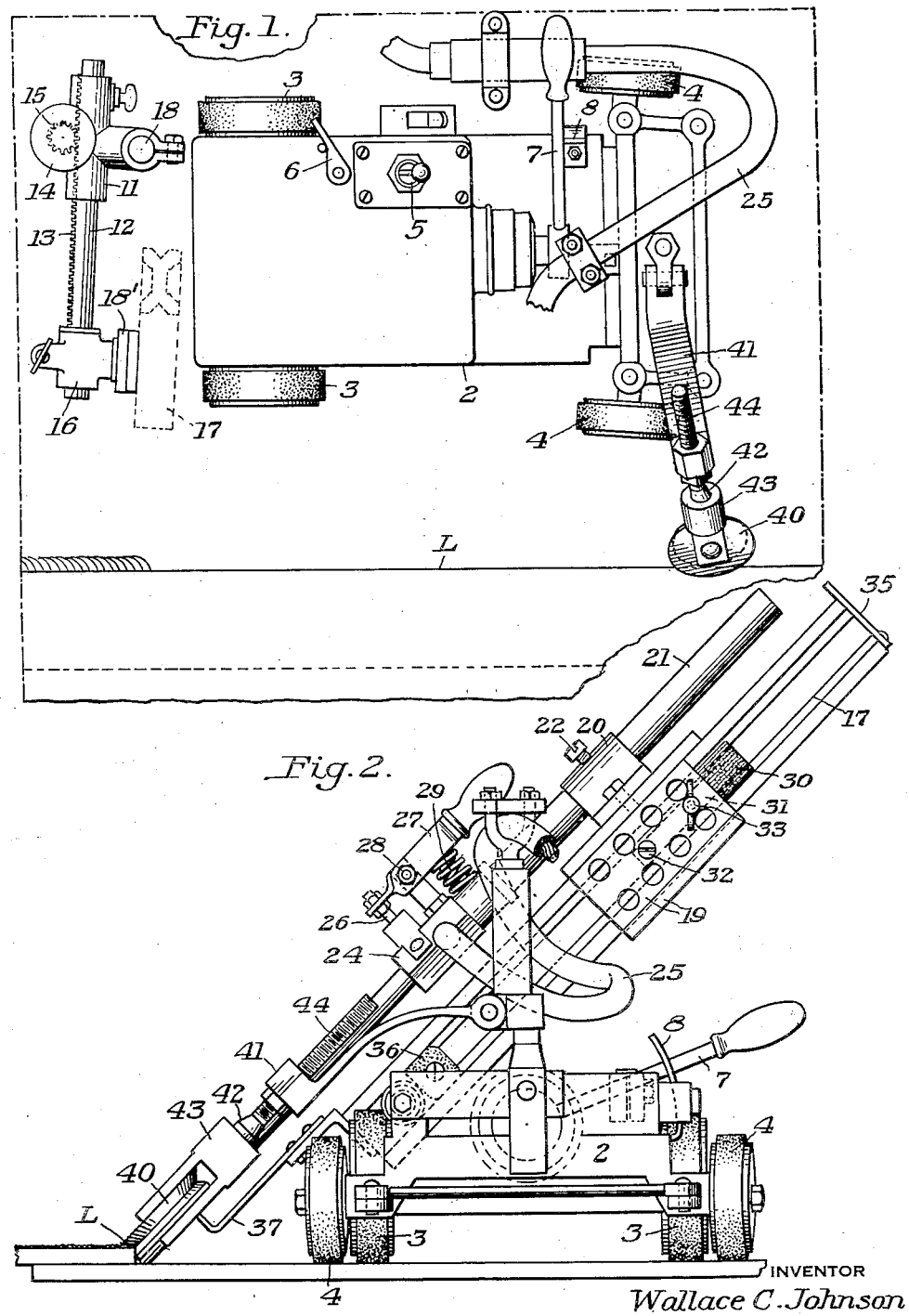
INVENTOR
Wallace C. Johnson
by his attorneys
Christy, Parmelee & Strickland

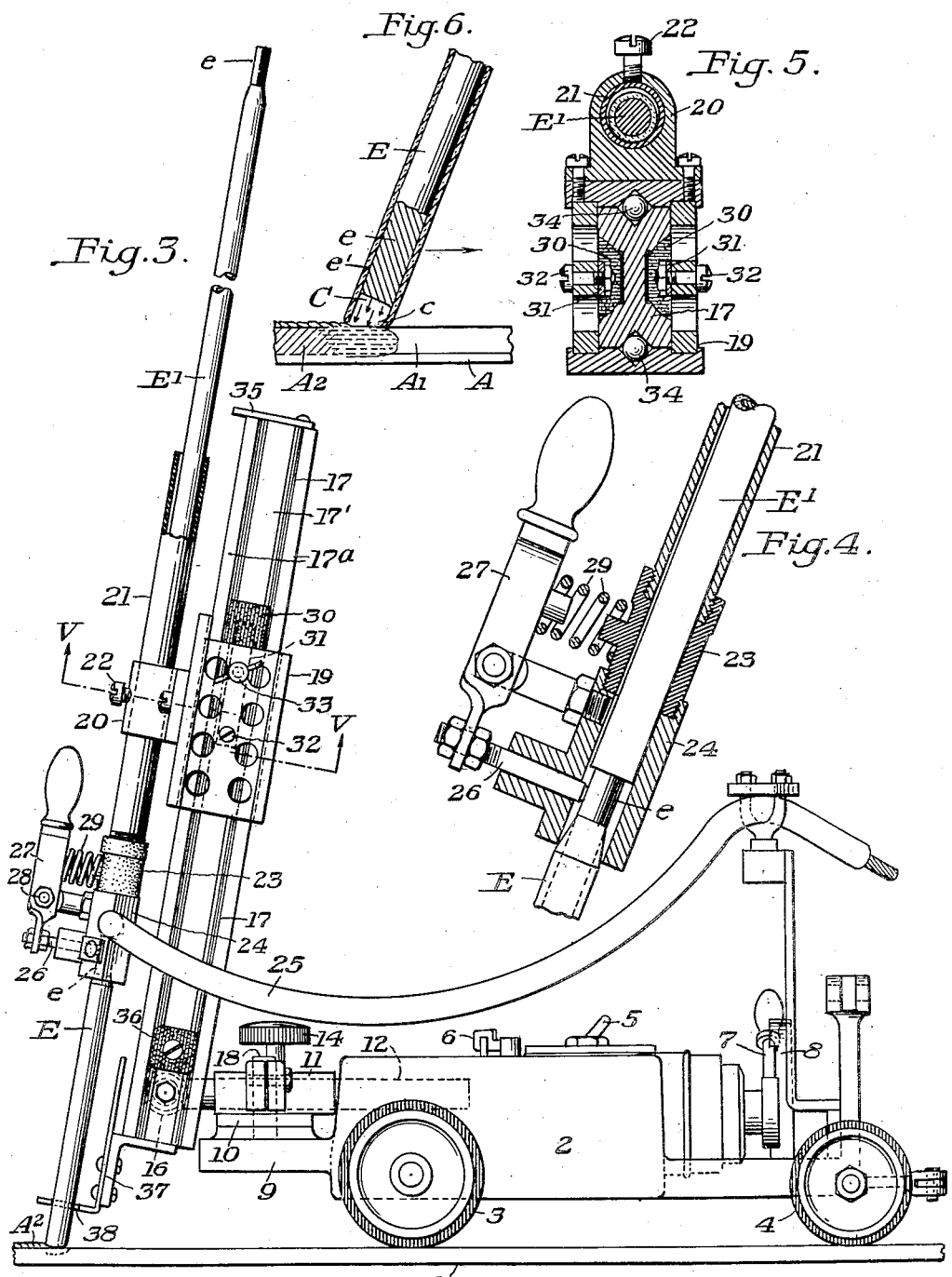

Patented Apr. 13, 1948

2,439,740

UNITED STATES PATENT OFFICE 2,439,740

ARC WELDING APPARATUS

Wallace C. Johnson, Sewickley, Pa., assignor to Dravo Corporation, Pittsburgh, Pa., a corporation of Pennsylvania Application December 29, 1943, Serial No. 516,026

14 Claims. (Cl. 219—8)

This invention relates to the art of electric arc welding and is for an improved method of and apparatus for welding.

In the art of electric arc welding, one side of an electric circuit is connected to the metal to be welded and the other side of the circuit is connected with a welding rod or wire. The terminal of this wire is touched to the work and then withdrawn a short distance to establish an electric arc. The arc disintegrates the rod and projects the metal against the work. Commonly the rod carries a coating which forms a flux, or a flux is placed on the work and melted by the arc.

In manual welding the electrode is manipulated by the operator who attempts to steady the rod to hold the arc as uniform as possible and at the same time move it along the work. This has certain well recognized limitations, and is confined to use with reasonably small diameter electrodes.

In fully automatic arc welders, the electrode is in the form of a long wire that is automatically advanced toward the work at a speed correlated to the speed of an electrically driven carriage (commonly called a "tractor") on which the welding head is carried, so that, the arc having been once started, the tractor follows along the work and the welding wire is consumed at a uniform speed.

With such automatic welding it is frequently the practice to "submerge" the arc in loose granulated flux that is fused as the weld progresses and which serves to reduce defects due to the presence of air, or its components, oxygen and nitrogen.

Fully automatic welders are also somewhat restricted as to the diameter of welding rod, requiring for their operation a flexible rod, and, in addition they are complicated mechanisms that are quite expensive.

The present invention involves what I term a semi-automatic method of and apparatus for arc welding which is much more simple than automatic welding but which, by reason of simple adjustments, is more easily adapted to varying conditions and which is more economical, and the apparatus moreover, is relatively simple and inexpensive. In addition, the use of electrodes of larger diameter is made possible. Tests indicate that welds may be effected much better and effectively than with hand or automatic arc welding.

According to my invention, the welding rod carries a flux coating that is of substantial strength at high temperatures. The welding rod has an end contacting the work and it is urged toward the work with a substantially uniform pressure, preferably by gravity, the coating on the rod serving to insulate the metal of the rod from direct contact with the work and thereby regulate the length of the arc. The metal core of the rod burns away ahead of the coating, so that the coating in effect forms a shield or crater about the arc, serving to more effectively project the welding metal against the work and exclude atmospheric gases from the weld. The coating fluxes at the edge of the crater and covers the surface of the weld, leaving a continuous protective film that is subsequently carried away.

Since the electrode bears constantly against the work, the feeding of the electrode is determined entirely by the rate at which the electrode melts away, which in turn depends upon the current density. The feeding of the electrode, however, in the present invention contemplates the provision of means for adjusting the force with which the electrode is urged toward the work.

My invention further contemplates that the welding rod is traversed or carried along by a carriage or tractor that may be driven at a selectively controlled speed. Thus while the rate at which the electrode feeds toward the work is determined by the melting away of the end of the rod, the travel of the electrode along the work is at a controlled speed. This provides greater flexibility than the more elaborate fully automatic welders in which the feeding of the electrode is correlated to the speed at which the carriage or tractor moves.

Generally therefore, my invention provides a method and apparatus according to which the electrode is moved along the weld at a selectively controllable speed, while the rate of feeding of the electrode and the length of arc are primarily governed by the electrode itself and the rate at which it is consumed, and wherein the biasing force with which the electrode is urged against the work is controlled. My invention also provides certain improvements whereby the apparatus is especially adapted to this type of welding, including provision for carrying a spare electrode that can be quickly inserted for use as a preceding electrode is consumed, and convenient provision for manipulation of the welder to adapt it to the work is made.

My invention may be more fully understood by reference to the accompanying drawings, in which:

Fig. 1 is a top plan view of the welder with the electrode holder removed;

Fig. 2 is a front elevation with the electrode projected to the side of the tractor for lap welding;

Fig. 3 is a side elevation of the welder with the electrode trailing behind for butt welding;

Fig. 4 is a detail longitudinal section through the electrode holder;

Fig. 5 is a transverse detail section in the plane of line V—V of Fig. 3; and

Fig. 6 is a schematic view showing the end of the weld rod in the operation of welding.

Referring first to Fig. 6, the method of welding is more or less schematically illustrated. In this view A represents the work, as for example, two plates arranged in abutting relation, the view being longitudinally of the line of weld, with a recess, such as a groove, along which metal is being deposited to form the weld, the groove being designated A' and the part of the weld which is complete is marked $A^2$. The electrode, designated E, has a ferrous metal core $e$ and a thick coating of flux $e'$, this flux being of a ceramic composition well known in the art and being a non-conductor of current. In operation, the core $e$ is recessed from the end of the rod, so that there is a cavity or chamber or crater C at the working end of the rod, the unfused sleeve of flux projecting beyond the metal to form this cavity or chamber. The extent to which the crater projects determines the length of the arc, and the crater forms an insulator separating the metal core $e$ from the work. The edge of this crater fuses away at the edge forming a flux over the molten metal being deposited. As the electrode moves along the work the soft edge of the crater trails very slightly, as indicated at $c$ in Fig. 6, folding inwardly at the leading edge to more effectively exclude air.

The electrode is biased to bear against the work with a substantially uniform pressure, and the pressure employed (and also the composition of the flux) will be factors controlling the depth of the crater or shoulder C. This crater tends to confine the arc and exclude atmospheric gases from the arc and over the pool of molten metal under the arc. The increase in the depth of the crater increases the length of the arc and therefore the depth of penetration of the weld metal. The coating may be varied in thickness and composition within wide limits, as will be understood by those skilled in the art; but may for example be between $\frac{1}{16}$ and $\frac{1}{8}$ of an inch thick and be of the range established by the American Welding Society between 6012 and 6020 in composition.

As heretofore indicated, the electrode is moved or traversed along the weld as it is consumed to progressively advance the weld, preferably as hereinafter more fully explained. It should also be explained that the arc may be started with an electrode having such a crater by the use of a wad of steel wool, or by initially trimming the end of the electrode to expose the metal.

The apparatus preferably comprises a carriage or tractor designated generally as 2. It has two wheels 3 which are driven by a motor, part of which is shown at M, for driving the carriage, and these wheels are rubber tired. At the opposite end of the carriage is a pair of dirigible wheels 4 which can be manipulated to steer the carriage, and which are also rubber tired, the rubber tires serving to electrically insulate the carriage from the work over which the carriage moves. The carriage or tractor is of a type commonly used in various welding and cutting operations, and it is controlled by means of a switch 5, a clutch 6, and a speed control lever or throttle 7. The throttle 7 moves in a vertical arc along a notched segment 8 so that the operator, who is usually wearing welding goggles during the operation of the machine, can determine the setting of the throttle by "feel."

At the rear end of the carriage or tractor is a platform 9 having a disk 10 pivotally supported thereon, there being a friction swivel for the disk 10. The disk 10 in turn supports a sleeve 11, and passing through the sleeve 11 is a horizontally extending bar 12 having rack teeth 13 thereon. A knob 14 is provided at the top of a pinion 15 at one side of the sleeve 11, the pinion 15 meshing with the rack 13 and providing an adjustment for moving the rod back and forth. Thus the rod can be moved back and forth and its angular position with respect to the carriage can be changed by reason of the pivotal support provided by the disk 10.

On the outer end of the arm 12 is a bracket 16 which carries an elongated guide member 17, the guide member 17 being connected with the fitting 16 by an adjustable swivel 18' so that the angularity of the guide may be changed.

In the drawings, the guide 17 is illustrated as being a bar having a modified I-beam cross section, there being a web portion 17' and top and bottom flange portions 17a. Mounted on the guide to move therealong is a slide block 19 having a fitting 20 thereon. Through this fitting 20 passes a metal sleeve or tube 21, there being a set screw at 22 for adjusting the relative position of the tube 21 with respect to the fitting 20. The lower end of the tube 21 is screwed into an insulating bushing 23 and on the lower end of the bushing 23 is an electrode holder 24.

The electrode holder 24 comprises a metal body to which the end of the conductor 25 for the welding current is secured. As shown in Fig. 4, it has an axially extending opening, which opening is in alignment with the bushing 23, which in turn is in alignment with the opening through the tube 21. There is a clamping pin 26 slidably mounted on the holder 24 and the outer end of this pin is connected with a lever 27 pivotally supported at 28. A spring 29 confined between the bushing 23 and the lever 27 serves to rock the lever 27 in a direction to push the pin 26 inwardly across the opening in the electrode holder. In this manner the end $e$ of the electrode E is firmly gripped in the electrode holder and electrical connection is made to the electrode. When an electrode has been completely consumed, the lever 27 may be pushed down against the pressure of the spring 29 to withdraw the pin 26. This allows the butt of the consumed electrode to drop out of the holder, and at the same time allows a spare electrode, designated $E^1$, to slide down through the electrode holder until its end portion $E^2$ is engaged in the holder, at which time the lever 27 is released. As will be hereinafter more fully apparent, the feeding of the second electrode into place as the first one is released is usually effected simultaneously with the sliding of the block 19 upward along the guide 17 to the uppermost end thereof. Since electrode E' has a coating of insulating material, the insulating bushing 23 is adequate to insulate the electrode holder from the sleeve or tube 21, current is not carried into the sleeve 21 by the second electrode.

As shown in the several figures, the electrode, which except for its upper terminal portion is coated with a refractory sleeve, bears against the work and the slide block 19 can only move down the guideway 17 as the electrode is consumed. Thus gravity exerts a biasing force for urging the electrode against the work and for feeding the electrode to the work as the electrode is consumed. However it is desirable in some cases to regulate the pressure with which the electrode is urged against the work, because if the pressure is too heavy, the fragile end of the crater will be destroyed, and the length of the arc will be quite uneven. In order to regulate the biasing force exerted by gravity, an adjustable brake of some sort may be used.

In the particular apparatus illustrated, the brake is comprised of friction pads, such as rubber pads 30 which are carried on flat metal springs 31 secured to an inner surface of the slide block 19 by a screw 32. A set screw 33 (there being a set screw for each spring) bears against the strip 31, and by tightening up on the set screw, each friction pad 30 may be pressed more firmly against the web 17a of the guide bar 17. Loosening up of the wing nut of course relieves the pressure of the friction pad, allowing the block to slide more freely. These friction pads thus provide a simple form of adjustable brake for controlling or regulating the biasing force with which the electrode is urged against the work. It will be understood, however, that various other well known forms of brakes or checks may be employed for resisting the free movement of the slide block 19 with its electrode holder along the guide. Balls 34, confined as shown in Fig. 5, aid in making the block move smoothly and prevent it from binding.

It will also be noted that in the particular form of apparatus illustrated, the slide which carries the electrode holder is biased entirely by gravity, but it will be apparent that for a machine designed to operate with the electrode in a position other than vertical or near vertical position, springs could be used for moving the slide block 19 along the guide.

At the top of the guide 17 is a stop 35 to limit the upward travel of the slide block 19, and at 36 is a cushion to restrict the downward travel of the guide. In the particular form of apparatus illustrated, a bracket 37 projects beyond the lower end of the guide 17, and it is provided with an eye 38 through which the end of the electrode passes, and by means of which the electrode is guided and directed.

When the machine is used for lap welding, the parts are adjusted as shown in Figs. 1 and 2, in which the wheels 4 are turned in toward the lap, indicated at L, while a thrust roller 40, carried on an arm 41 at the front of the machine, rides along the lap and maintains the space between the line of travel of the machine and the lap constant. The tractor will not ride away from the lap, because the wheels tend to urge it toward the lap, and it cannot approach closer because the thrust roller 40 will not permit it to do so. The thrust roller is insulated from the carriage through insulation appropriately set in the assembly, and which for example may comprise an insulating body 42 at the top of the yoke 43 in which the roller is mounted. This insulator 42 in turn has a threaded shaft 44 that passes through the arm 41 whereby the effective length of the roller arm may be regulated.

Also, in the operation of lap welding the guide 17 is swung around to the position shown in Fig. 2, where it is at an angle of between 45° and 60° to horizontal plane, and extends crosswise of the line of travel of the carriage. It however may be canted so that it will have a rake or slope toward the rear, as well as toward the side. The manner of supporting the electrode enables it to be quickly adjusted to the proper angle, and the rack and pinion adjustment enables the proper relation between the electrode and the work to be established and maintained.

When the machine is being used for butt welding, the electrode is swung around to trail behind the tractor, and it is brought to an angle much closer to the vertical, being preferably only 10° or 15° away from a true vertical position. However, this angle is not critical and may be changed from time to time, as the operator may choose.

The welding rods which are used are of a convenient length, their length being determined by the length of the guide 17, and the range of movement of the slide block 19 which carries the electrode holder. However the invention permits of welding rods of relatively large diameter being used, it being possible to use much larger diameters than can satisfactorily be used either with hand welding methods or with fully automatic methods. This enables a very heavy weld to be made, and at the same time of course decreases the rate at which the electrode is consumed, per unit of weight of metal deposited, as a smaller diameter electrode would of course be consumed more rapidly in depositing the same weight of metal.

The machine is constantly operated with one electrode in the holder, and one electrode in the tube 21 which constitutes a magazine. As the electrode is consumed and becomes shorter, the slide 19 of course moves toward the lower end of the guide so that by the time an electrode has been exhausted, except for a short length of butt end, the electrode holder is at the lower limit of its travel. Consequently, when the lever 27 is operated to release the butt and allow the second rod to enter the holder, the whole slide mechanism is simultaneously moved to its uppermost position, so that the operation of resetting the slide and replenishing the electrode is accomplished simultaneously, and with no appreciable delay.

As has been heretofore stated, the carriage is propelled at a rate determined by the operator through the setting of the speed lever 7, according to the thickness of weld he desires to make, while the rate at which the electrode is consumed is entirely independent of the speed of travel of the tractor. However, the operator will co-relate the speed of the tractor and the brake for controlling the downward movement of the electrode so as to secure the best conditions for welding. One important advantage of the invention, however, is that if there are irregularities in the plates to be welded, and there usually are, the operator, by manipulation of the speed lever 7, can slow down the rate of travel where an irregularity demands that more metal be deposited, and speed up the rate of travel where conditions require less metal. In this respect the present method and apparatus are much more flexible than with machines of the fully automatic type where the speed of the feeding of the electrode is directly proportioned to the speed of travel of the tractor.

In actual use, the operator grasps the speed control lever 7 in one hand and the knob 14 in the other and manipulates the speed and "in and out" movement of the electrode relatively to the carriage so as to deposit the welding metal in exactly the right place and in the right amount. By proper control of the spring brakes or other biasing means, "undercutting," i. e., the formation of a groove along the edge of the line of weld is prevented.

While I have illustrated and described one particular embodiment of my invention, it will be understood that this is merely by way of illustration, and that various changes and modifications may be made in the apparatus in the contemplation of my invention, and under the scope of the following claims. It will also be understood that while I have mentioned certain features and advantages, other advantages and economies are secured by the use of my invention, as will be apparent to those skilled in the art.

I claim:

1. Welding apparatus of the type wherein an electrode is traversed along the work with the electrode having a refractory coating which maintains the metal core of the electrode spaced from the work comprising a movable carriage, a guide on the carriage, an electrode holder movable by gravity along the guide, and adjustable friction brake means for retarding the movement of the holder.

2. Welding apparatus of the type wherein an electrode is traversed along the work with the electrode having a refractory coating which maintains the metal core of the electrode spaced from the work comprising a movable carriage, a guide on the carriage, an electrode holder movable by gravity along the guide, and adjustable braking means effective between the guide and the holder for retarding the movement of the holder.

3. Welding apparatus of the type wherein an electrode is traversed along the work with the electrode having a refractory coating which maintains the metal core of the electrode spaced from the work comprising a movable carriage having means for propelling it, a guide element on the carriage swiveled for adjustment with respect to the carriage about vertical and horizontal axes, adjusting means for releasably holding the guide element in the position to which it is so adjusted, and an electrode holder movable by gravity along the guide.

4. Welding apparatus of the type wherein an electrode is traversed along the work with the electrode having a refractory coating which maintains the metal core of the electrode spaced from the work comprising a self-propelled carriage having a variable speed lever thereon, means on the carriage providing a guide, an electrode holder biased to move along the guide to urge an electrode carried by said holder toward the work to be welded, and an adjustable brake for the electrode holder, whereby the speed of travel of the carriage and the rate of consumption of the electrode may be adjusted in co-relation to the work being done.

5. Welding apparatus of the type wherein an electrode is traversed along the work with the electrode having a refractory coating which maintains the metal core of the electrode spaced from the work comprising a self-propelled carriage, a guide on the carriage adjustable about vertical and horizontal axes, an electrode holder movable by gravity along the guide, adjustable braking means for retarding the speed of movement of the holder, and adjusting means for changing the position of the guide with respect to the carriage.

6. Welding apparatus of the type wherein an electrode is traversed along the work with the electrode having a refractory coating which maintains the metal core of the electrode spaced from the work comprising a carriage, a guide on the carriage, a slide member movable along the guide, an electrode holder on the slide having means for receiving and clamping the end of a metal electrode, and a tubular extension on the holder constituting a magazine holding a second electrode, said tubular extension being in axial alignment with the holder whereby an electrode in the extension passes through the holder into position to be used.

7. Welding apparatus of the type wherein an electrode is traversed along the work with the electrode having a refractory coating which maintains the metal core of the electrode spaced from the work comprising a carriage, a guide on the carriage, a slide member movable along the guide, an electrode holder on the slide having means for receiving and clamping the end of a metal electrode, and a tubular extension on the holder constituting a magazine holding a second electrode, said tubular extension being in axial alignment with the holder whereby an electrode in the extension passes through the holder into position to be used, said slide being movable by gravity along the guide and adjustable braking means for the slide.

8. Welding apparatus comprising a tractor for traversing an electrode along the work, means on the tractor for guiding and feeding a coated electrode to the work by gravity, a speed control member on the tractor, and means spaced from the speed control member for manually moving the electrode in and out with reference to the tractor whereby the operator may grasp the speed control member in one hand and the said last named means in the other to simultaneously co-relate the speed of the tractor and the speed of the electrode as the tractor moves along the work.

9. Welding apparatus comprising a self-propelled tractor, an electrode on the tractor supported for movement by gravity toward the work, and friction brake means for controllably regulating the gravity feed of the electrode.

10. A welding machine of the class described in which a coated electrode is urged toward the work and maintained in spaced relation to the work by the coating which is consumed less readily than the metal of the electrode, said machine comprising a carriage, a guide post on the carriage, an electrode holder slidable on the guide post, and an adustable friction shoe on the holder engaging the post.

11. A welding machine of the class described in which a coated electrode is urged toward the work and maintained in spaced relation to the work by the coating which is consumed less readily than the metal of the electrode, said machine comprising a carriage, a guide post on the carriage, an electrode holder slidable on the guide post, an adjustable friction shoe on the holder engaging the post, and means for adjustably holding the guide post at different inclinations from a vertical position.

12. A welding machine of the class described in which a coated electrode is urged toward the work and maintained in spaced relation to the work by the coating which is consumed less readily than the metal of the electrode, said machine comprising a carriage, a guide post on the carriage, an electrode holder slidable on the guide post, an adjustable friction shoe on the holder engaging the post, means for adjustably holding the guide post at different inclinations from a vertical position, and means for adjustably moving the guide post toward or away from the axis of movement of the carriage.

13. A welding machine of the class described comprising a self-propelled tractor with steering means therefor, an electrode guide on the tractor extending transversely of the tractor and at an inclination to one side of the tractor, means on the guide for supporting and feeding an electrode by gravity, and a thrust roller projecting at an angle from the same side of the tractor and transversely to the direction of travel of the carriage as the guide to engage the work and cause the tractor to travel in a proper path along the work when the tractor is steered to urge it slightly toward the work.

14. Welding apparatus of the type wherein an electrode is traversed along the work with the electrode having a refractory coating which maintains the metal core of the electrode spaced from the work comprising a carriage, a guide on the carriage, a slide member movable along the guide, an electrode holder on the slide having means for receiving and clamping the end of a metal electrode, a tubular extension on the holder constituting a magazine holding a second electrode, said tubular extension being in axial alignment with the holder whereby an electrode in the extension passes through the holder into position to be used, said slide being movable by gravity along the guide, and adjustable braking means for the slide, the said electrode holder being insulated from the slide on which it is carried.

WALLACE C. JOHNSON.

REFERENCES CITED

The following references are of record in the file of this patent:

UNITED STATES PATENTS

| Number | Name | Date |
| --- | --- | --- |
| 279,363 | Edgerton | June 12, 1883 |
| 949,151 | Lincoln (1) | Feb. 15, 1910 |
| 1,305,039 | Wagner | May 27, 1919 |
| 1,498,167 | Hill | June 17, 1924 |
| 1,560,699 | Kramer et al. | Nov. 10, 1925 |
| 1,827,245 | Lincoln (2) | Oct. 13, 1931 |
| 1,884,826 | Peck | Oct. 25, 1932 |
| 1,965,331 | Chapman | July 3, 1934 |
| 2,163,439 | Somerville | June 20, 1939 |
| 2,314,917 | Baird | Mar. 30, 1943 |
| 2,357,376 | Baird (2) | Sept. 5, 1944 |

FOREIGN PATENTS

| Number | Country | Date |
| --- | --- | --- |
| 112,353 | Great Britain | Mar. 19, 1917 |